Feb. 28, 1967          G. HIRS          3,306,458
                  MULTIPLE SHELL FILTERS
Filed Feb. 28, 1964                    2 Sheets-Sheet 1

INVENTOR.
GENE HIRS
BY WILSON, SETTLE & CRAIG
ATTORNEYS

Feb. 28, 1967    G. HIRS    3,306,458
MULTIPLE SHELL FILTERS
Filed Feb. 28, 1964    2 Sheets-Sheet 2
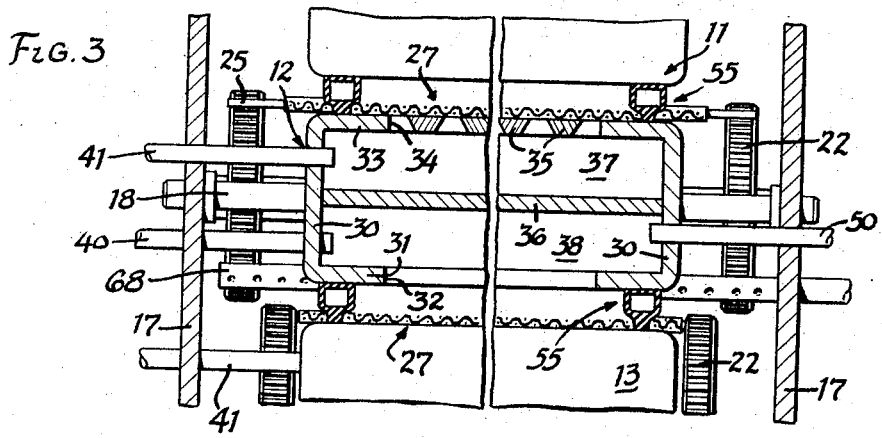
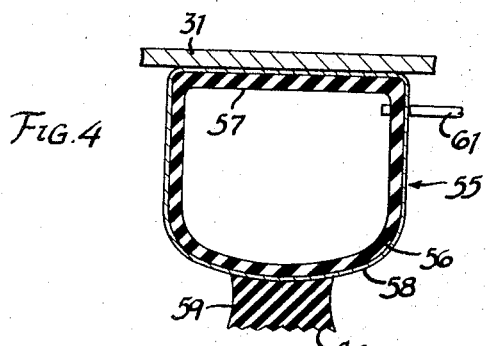
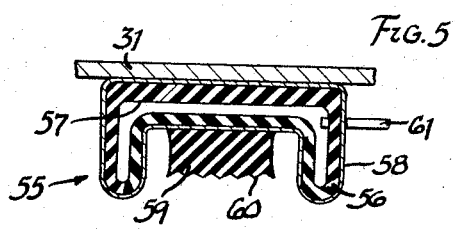
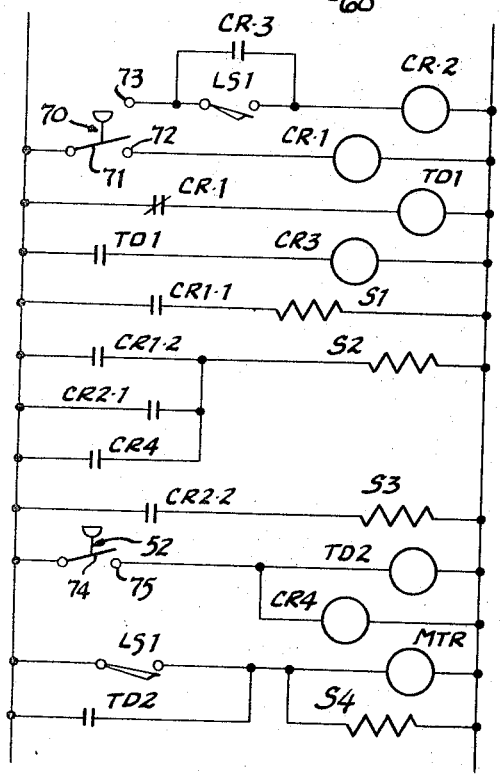
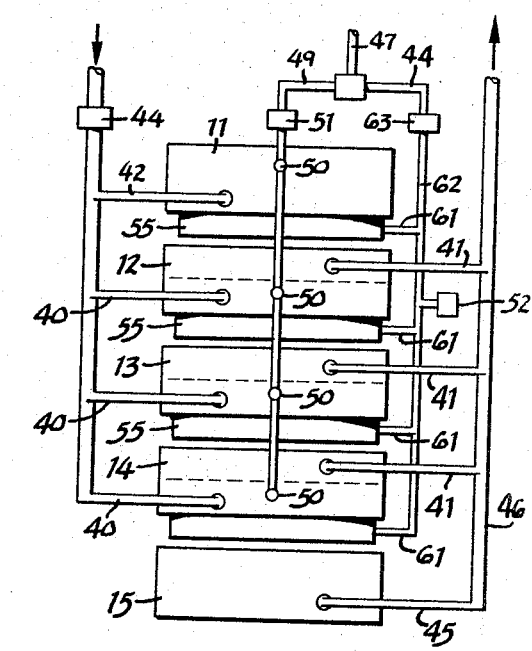
INVENTOR.
GENE HIRS
BY
WILSON, SETTLE & CRAIG
ATTORNEYS United States Patent Office 3,306,458
Patented Feb. 28, 1967

3,306,458
MULTIPLE SHELL FILTERS
Gene Hirs, 6865 Meadowlake,
Birmingham, Mich. 48124
Filed Feb. 28, 1964, Ser. No. 348,119
4 Claims. (Cl. 210—333)

The present invention relates to a filter mechanism. More specifically, the present invention proposes an extremely efficient and structurally simple filter mechanism, utilizing a plurality of stacked, fluid-conducting shells having filter media interposed therebetween and sealed thereto by inflatable sealing elements.

The present invention constitutes an improvement upon and further development of the invention disclosed in my United States Letters Patent No. 2,867,324, entitled, "Filter Apparatus." This patent discloses the utilization of an inflatable seal for sealing to one another superimposed fluid-conducting shells with a filter medium interposed therebetween. More specifically, the patent shows the utilization of two such shells with a paper or other web-like filter medium interposed between the shells and engaged by the sealing elements.

The device of the present invention carries the development illustrated and described in said patent to a further state of development to provide multiple shells, to provide a new and more efficient seal member, and to more effectively utilize the structure of the patent.

The present invention structurally incorporates a plurality of stacked, individual, fluid-conducting shells including an uppermost shell, a lowermost shell, and intermediate shells. The intermediate shells are subdivided into upper and lower compartments, so that in five such shells, for example, four separate filter media may be utilized. The filter media are engaged in fluid-tight sealing relation by inflatable sealing elements carried by the shells, preferably by that shell overlying the media. Preferably, the filter media take the form of woven screen elements which are carried by conveyer chains positioned exteriorly of the shells and serving to convey the filter media from their interposed position between the shells to an exterior cleaning position, and then back to the interposed position.

One of the prime advantages of the device of the present invention is that it affords a horizontally extending filter medium when the filter is being utilized, the medium being relatively inverted for cleaning during its removal from its in-use position intermediate the shells.

This horizontal positioning is also advantageous in the utilization of the device as a part of a "pre-coat" filter operation wherein a particulate filter aid, such as fuller's earth or the like, is utilized in conjunction with the foraminous filter medium. The horizontal positioning of the filter aid prevents any loss of the filter aid in the event of failure of pressure during the filtering operation. This is in contrast to a conventional pre-coat filter mechanism wherein the filter aid is applied to foraminous vertical tubes. In such mechanisms when there is a loss of fluid pressure, there is no pressure differential to hold the filter aid on the vertical elements, and the filter aid is lost.

Further, the provision of vertically stacked, fluid-conducting shells makes possible the provision of a mechanism having an extremely large filter medium area in a minimum floor space. The possibilities of inverting the filter medium during cleaning, as by steam jet, further adapts the mechanism to broad utilization, where pre-coat filters have never been used before, i.e., in the water treatment field.

It is, therefore, an important object of the present invention to provide a new and improved filter mechanism utilizing a plurality of superimposed shells having filter media interposed therebetween.

Another important object of this invention is the provision of a filter mechanism wherein a plurality of superimposed filter media are clamped between superimposed shells provided with inflatable seals, the seals being deflatable to accommodate removal and insertion of the filter media therebetween.

Other objects of this invention will appear in the following description and appended claims, reference being had to the accompanying drawings forming a part of this specification wherein like reference characters designate corresponding parts in the several views.

On the drawings:

FIGURE 3 is a sectional view, with parts shown in elevation, taken along the plane 3—3 of FIGURE 2;

FIGURE 4 is an enlarged, fragmentary sectional view of a seal element of the present invention in an inflated, sealing position;

FIGURE 5 is a view similar to FIGURE 4, illustrating the element in a collapsed, non-sealing position;

FIGURE 6 is a schematic illustration of the arrangement of the superimposed fluid conducting shells; and FIGURE 7 is a wiring diagram illustrating the control mechanism for the device of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
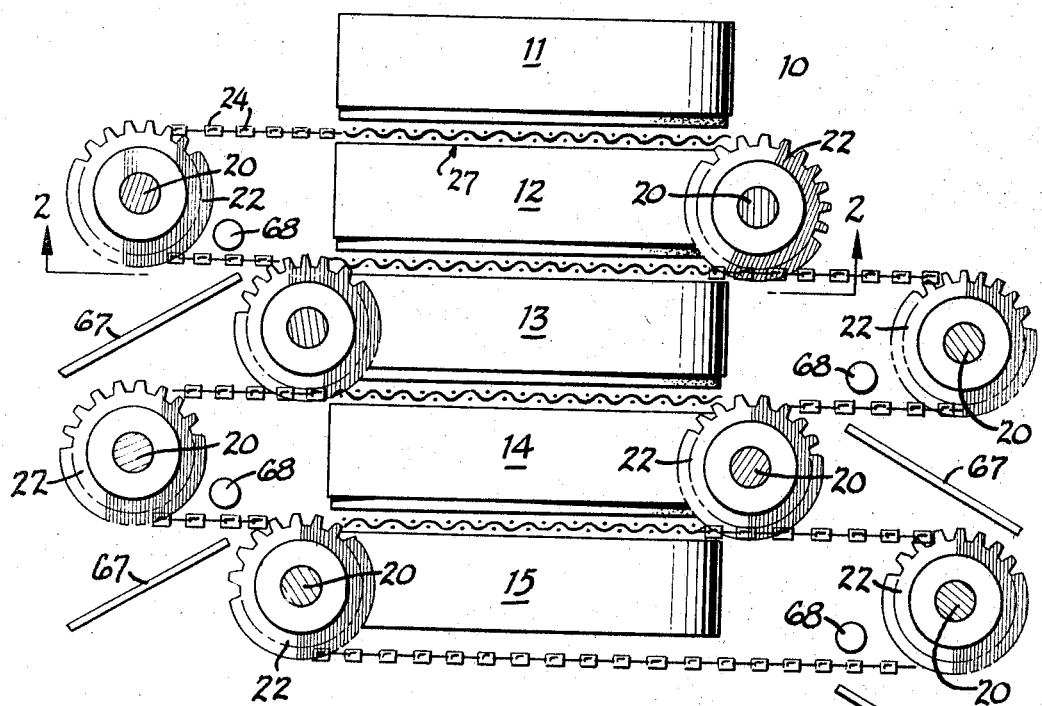
FIGURE 1 is a somewhat diagrammatic side elevational view of a filter mechanism of the present invention capable of carrying out the method of filtration of the present invention.

As shown on the drawings:

In FIGURE 1, reference numeral 10 refers generally to a filter mechanism of the present invention comprising a plurality of vertically stacked fluid-conducting shells 11, 12, 13, 14 and 15.

Figure 2:
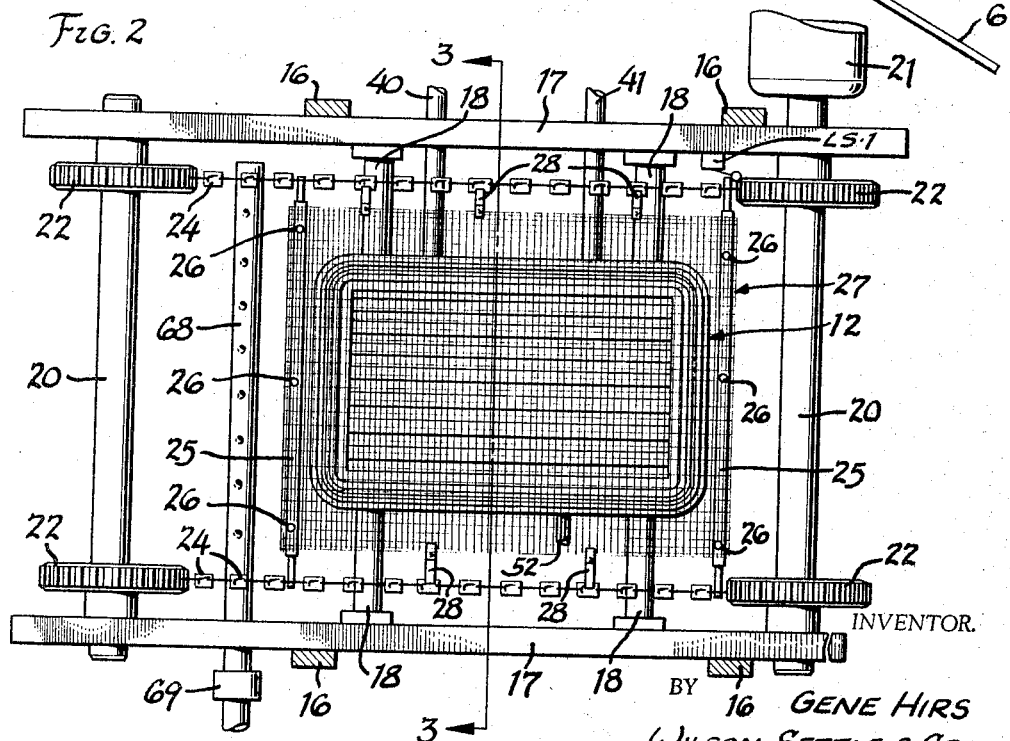
FIGURE 2 is a sectional view, with parts shown in elevation, taken along the plane 2—2 of FIGURE 1.

Each of the shells 11 through 15 is of substantially the same over-all configuration, the shells being generally rectangular as illustrated in FIGURE 2 of the drawings. The shells are retained in their vertically stacked, vertically spaced relation, by means of vertical supports 16 carrying horizontal supporting plates 17 from which the individual shells 11 through 15 are supported by the inwardly projecting support brackets 18.

The horizontal support elements 17 have journaled therein, by suitable means, longitudinally spaced, horizontally aligned shafts 20, one such shaft of each pair being driven by a suitable means, such as an electric motor 21. Secured to each of the shafts 20 is a spaced pair of sprockets 22, the sprockets being lapped by endless chains 24. Carried by the chains 24 and projecting transversely therebetween are elongated driving bars 25, these driving bars being secured, as by rivets 26, to the forward and rearward, respectively, marginal edges of the rectangular filter medium, indicated generally at 27. The rear bar 25 has an abutment 25a thereon for actuating a limit switch LS1.

From FIGURE 3, it will be seen that the sprockets 22 of adjacent shells are transversely offset from one another, to thereby prevent any interference of the adjacent chains 24.

This filter medium is preferably a fine mesh screen of the type conventionally utilized as a filter medium, the medium 27 being of a rectangular extent greater than the rectangular extent of the associated shells 11 through 15, inclusive. The lateral edges of each such screen are secured to the adjacent chain 24 by the bars 25 and also by transversely projecting attachment brackets 28, so that the filter medium 27 travels with its associated pair of chains 24 as the one shaft 20 is rotated by the driving motor 21.

As best illustrated in FIGURES 3 through 5, a representative intermediate shell 12 comprises side walls 30, a bottom wall 31 which is centrally apertured, as at 32, and an upper wall 33 centrally apertured, as at 34. The side walls 30 enclose the perimeter of the complete shell 12, and the lower aperture 32 and the upper aperture 34 are of an extent substantially the same as the extent of the lower wall 31 and the upper wall 33, respectively.

The upper aperture of each of the intermediate shells 12, 13, 14 is traversed by a plurality of longitudinally extending support elements 35, while the lower opening 32 is left open. An intermediate, transverse interior wall 36 subdivides the interior of the shell into an upper compartment 37 and a lower compartment 38. Ingress for "dirty" fluid, i.e. fluid containing contaminants, is provided through an inlet pipe 40 communicating with the lower compartment 38, while egress for "clean" fluid, i.e., filtrate fluid, free of contaminants is provided by a conduit 41 communicating with the upper compartment 37.

As illustrated in FIGURE 6 of the drawings, the uppermost shell 11 is not provided with the interior wall 36, and the upper wall of the shell 11 is closed. The upper shell 11 receives dirty water from an inlet line 42. This line 42 and the lines 40 communicate with an inlet header line 43 in which a solenoid-actuated control valve 44 is located. Similarly, the lowermost shell 15 is not subdivided by an interior wall and has a closed bottom wall, the upper wall being provided with supports 35 similar to the supports of the shells 12, 13 and 14. The lowermost shell 15 has a filtrate egress conduit 45 communicating with an outlet header conduit 46, as do the filtrate conduits 41.

Additionally, a main air supply line 47 is subdivided into a pair of conduits 48, 49, the conduit 49 being connected through individual conduits 50 with the upper shell 11 and each of the lower compartments 38 of the shells 12, 13 and 14. A fluid control valve 51 is interposed in the conduit 49, the valve preferably being solenoid actuated and controlling the flow of air under pressure into the upper shell 11, the lower compartments of shells 12, 13 and 14.

As best illustrated in FIGURES 3, 4 and 5, the lower wall 31 of the uppermost shell 11 and the lower wall of each of the shells 12, 13 and 14 is provided with a seal indicated generally at 55, this seal circumscribing the aperture 32 in the bottom wall 31 of each of the shells. As illustrated in FIGURE 4 of the drawings, the shell seal 55 comprises a hollow generally rectangular diaphragm 56 formed of fabric coated with a natural or synthetic rubber. The diaphragm, when inflated, is of the configuration of FIGURE 4 of the drawings.

The seal 55, when molded, is in its deflated condition and tends to collapse to its deflacted condition whenever fluid, such as air, under pressure is not present in the enclosed diaphragm portion 56. Thus, one wall 57 of the diaphragm is secured to the wall 31 of the shells 11 through 14, and the opposing wall 58 of the diaphragm carries a striker bead 59, preferably formed of solid rubber, and provided with a serrated or grooved contacting face 60 adapted for sealing contact with the filter medium 27, as best illustrated in FIGURE 3 of the drawings. One side wall of the diaphragm 55 receives an air inlet pipe 61 by means of which the seal is inflated to its configuration of FIGURE 4.

From FIGURE 6 it will be seen that each seal 55 for each of the shells 11, 12, 13 and 14, is provided with an air supply conduit 61, these lines 61 being connected by pneumatic header pipes 62 with the air supply conduit 48, an air supply control valve 63 being provided in the conduit 48. When the valve 63 admits air to the conduit 48, the seals 55 are inflated to the configuration of FIGURE 4; when the valve 63 is actuated to prevent the passage of air and to vent the conduit 62 to the atmosphere, the seal collapses to the configuration of FIGURE 5 of the drawings. A pressure responsive switch 52 is responsive to pressure in the header pipe 62, for a purpose hereafter more fully described.

In FIGURE 3 of the drawings, the seals 55 are indicated in their inflated condition, i.e., with the striker heads 59 contacting the filter medium. Under these circumstances a full peripheral seal exists between the shell 11 and the shell 12, between the shell 12 and the shell 13, and between the shells 13, 14 and 14, 15, respectively.

Thus, dirty fluid introduced into the upper shell 11 will flow downwardly through the opening in the bottom wall thereof, through the filter medium 27, through the upper wall aperture 34 of the next lower shell 12, and into the upper compartment 37 thereof for egress through the filtrate conduit 41. Of course, any contaminants in the dirty fluid will be retained upon the filter medium 27. Similarly, dirty fluid introduced into the lower compartment 38 of the shell 12 by the conduit 40 will flow downwardly through the shell aperture 32 and will be confined by the seal 55 for flow through the filter medium 27 into the upper compartment 37 of the next lower shell 13 for egress therefrom.

Similarly, the filter media 27 may have a filter aid applied thereto by merely admixing the filter aid with fluid introduced through the header conduit 43 and the inlet conduit 42 and 40 into the uppermost shell 11 and the upper compartments 37 of the shells 12, 13 and 14, this filter aid being retained upon the filter media 27 to aid in the subsequent filtering of dirty fluid also introduced through the header conduit 43 and the individual compartment conduits 40, 42.

As illustrated in FIGURE 7 of the drawings, when the device of the present invention is in normal operation, a pressurestat or pressure sensitive switch, indicated generally at 70, is actuated by fluid presure in one of the inlet compartments 38 of one of the shells 11 through 14. For example, the pressurestat 70 may be responsive to the pressure in the lower compartment 38 of the shell 12. When the pressure in the shell exceeds a predetermined normal pressure because of clogging of the filter medium 27, and any filter aid thereon, the pressure actuates the pressurestat so that a switch blade 71 closes a contact 72, thereby actuating a relay CR1.

This relay CR1 has a first set of contacts CR1–1 effective to actuate a solenoid S1 opening the valve 51 (FIGURE 6), so that air under pressure is introduced through the conduit 49 and through the individual lines 50 into the upper shell 11 and the compartments 38 of the shells 12, 13 and 14. This air under pressure initiates a "blow down" cycle by means of which the air under pressure forces liquid from the compartment 38 and the uppermost shell 11 downwardly through the filter media 27. At the same time a second set of contacts CR1–2 for the relay CR1 energizes a solenoid S2, this solenoid actuating the valve 44 in the dirty water supply conduit 43, thereby cutting off the ingress of fluid into the lower compartment 38.

The blow-down cycle continues until such time as the compartments 38 are emptied of dirty fluid, the resulting filtrate flowing through the individual conduits 41 from the compartments 37 and the lowermost shell 15 through the drain conduit 46. When the compartments 38 are emptied, there will be a decrease in pressure therein, and the pressurestat 70 will move the switch blade 71 from the contact 72 into engagement with a second contact 73.

Movement of the blade 71 from the contact 72 deenergizes the relay CR1 and actuates a momentary timer TD1, the contacts of which momentarily actuate a relay CR3. The points of the relay CR3 by-pass the normally open limit switch LS1, current flowing to energize the relay CR2 even though the limit switch LS1 is open by contact of the abutment 25a with the limit switch actuating arm. The time delay TD1 bridges the period of time between completion of the blow-down and advancement of the chains 24, thus allowing the seals to collapse to their configuration of FIGURE 5. Energization of the relay CR2 maintains the solenoid S2 energized by means of the contact points CR2–1. Additional relay contacts CR2–2 energize the solenoid S3, this solenoid interrupting the flow of air under pressure through the branch conduits 49 and the valve 63, the conduit 62 and the individual lines 61 to the seals 55. Thus, actuation of the valve 63 by the solenoid S3 vents the seals, so that the seals collapse to their configuration of FIGURE 5 from their normal inflated configuration of FIGURE 4.

When the seals are deflated, the drop in seal pressure actuates the pressure responsive switch 52 in the line 62, this pressurestat closing the switch blade 74 upon contact 75, thereby actuating simultaneously a time delay TD2 and a relay contact CR4. The relay contact CR4 is connected in parallel with the contact points CR1–2 and CR2–1, so that the contact points CR4 maintain the solenoid S2 energized. The points TD2 of the time delay TD2 energize the motor relay MTR, thereby energizing the motor 21 to rotate the shaft 20 in a counterclockwise direction and, at the same time, energize the relay S4 for the steam valve 69, thereby introducing steam through the steam pipe 68. The time delay TD2 thus actuates the motor 21 despite closure of the switch LS1.

As the motor 21 is actuated, the chains 24 travel in a horizontal plane to the left, clockwise about the lefthand sprocket 22, and carry the filter medium 27 interposed between the shells 11 and 12 beneath the steam pipe 68 from which steam is issuing.

This steam under pressure, passing through the foraminous medium 27, carries from the undersurface of the inverted medium any contaminants accreted thereon, as well as any previously applied and used filter aid. A deflector plate 67 is provided to afford a path of exit for such contaminants and used filter aid.

At the same time that the motor for the filter medium 27 between the shells 11 and 12 is actuated, a similar motor 21 for the filter medium interposed between the shells 12 and 13 is actuated to rotate the shaft 20 in a clockwise direction, so that the filter medium 27 between the shells 12 and 13 is carried in a righthand direction about the righthand sprocket 22 and into inverted position beneath the adjacent steam pipe 68. By virtue of the reversal of direction of travel of the filter medium interposed between the two uppermost shells and the next two lower shells, there is no interference between the adjacent filter media. Similarly, the medium 27 between the shells 13, 14 travels in a counterclockwise direction; while the medium 27 between the shells 14, 15 travels in a clockwise direction.

Each of the filter media 27 continues to travel in its appropriate direction until such time as the limit switch LS1 is actuated from its closed position, since the media-actuating motors 21 are primarily energized by closure of the limit switch LS1. After the filter media has been actuated to an extent such that the abutment allows the limit switch actuating arm to move to its normally closed position, the continued actuation of the relays TD1 and TD2 is no longer necessary. Thus, the relay CR2 remains energized despite expiration of the momentary timer TD1, and the motor relay MTR and the steam relay S4 also remain actuated despite expiration of the timer TD2.

When one complete loop of the filter medium 27 has been accomplished and its return to its initial starting position has been attained, the limit switch LS1 is opened by the abutment. The opening of this limit switch immediately deenergizes the relay CR2, the motor MTR and the solenoid S4 for the steam valve 69.

The de-energization of the relay CR2 de-energizes the seal release valve S3, and the seal is re-inflated to its condition of FIGURE 4. At such time that the seal pressure has built up sufficiently to actuate the pressurestat 52 to an extent that the switch blade 74 is spaced from its contact 75, the relay CR4 is de-energized and the solenoid S2 for the water control valve 44 will be de-energized, thereby accommodating the flow of dirty water through the conduits 43, 42 and 40, into the lower shell compartments 38, and into the uppermost shell 11. At this time, the complete cycle has been accomplished.

I claim:

1. In a filter mechanism for removing contaminant particles from a contaminated liquid, at least three superimposed hollow shells arranged in spaced vertically stacked relation providing an uppermost shell, at least one intermediate shell and a lowermost shell, each of said shells having side walls imperforate to said fluid and substantially horizontal upper and lower surfaces, the upper surface of the uppermost shell and the lower surface of the lowermost shell being imperforate, and the remainder of said upper and lower surfaces of said shells being perforate to said fluid, each of said shells with the exception of said uppermost shell and said lowermost shell being subdivided into upper and lower compartments by an interior substantially horizontal fluid impervious wall, individual filter media interposed respectively between adjacent shells, said media being imperforate to said contaminants and perforate to said liquid and lying substantially parallel to said upper and lower shell surfaces adjacent thereto, the lowermost shell and the upper compartment of each shell with the exception of said uppermost shell underlying said media, respectively, and the uppermost shell and the lower compartment of each shell with the exception of the lowermost shell overlying said media, respectively, an inflatable peripheral seal carried between shells at one of said upper and lower surfaces by each shell with the exception of one of said uppermost and said lowermost shells, each said seal comprising an annular hollow flexible member having a first wall affixed to said one surface and having a second wall opposite said first wall for contacting said filter medium to press the same against the opposing horizontal surface of the next adjacent shell, said seal member having side walls extending between said first and second walls and having a deflated condition wherein said second wall is self-biased to a retracted position between said side walls and immediately adjacent said first wall so that when said seal member is deflated said second wall retracts within said side walls to release said filter medium and provide clearance for movement thereof without requiring any movement of said shells, and said seal member having an inflated condition in which said second wall is extended out from within said side walls to press said filter medium against said opposing horizontal surface, means for inflating said seals to displace the media adjacent thereto into fluid-tight engagement with the horizontal surface of the next adjacent shell, thereby peripherally sealing the adjacent horizontal shell surfaces to one another with the media therebetween, means for introducing fluid containing contaminant particles into said uppermot shell and into the lower compartment of each of the other of said shells, and means for removing filtrate fluid from the lowermost of said shells and the upper compartments of the remainder of said shells, respectively.

2. The filter mechanism of claim 1 in which said inflatable peripheral seals are carried respectively by the lower horizontal surface of said uppermost shell and by the lower horizontal surface of each of said intermediate shells.

3. The filter mechanism of claim 1 further including spaced pairs of sprockets straddling each of said shells except for said uppermost shell, endless chains lapping the spaced sprockets of each pair and extending therebetween in a plane which is substantially coplanar with each of said filter media respectively, means securing said media to said chains respectively, and means for driving said sprockets to advance said chains and said media from the media position interposed between said shells to a position external to said shells.

4. The filter mechanism of claim 3 further including means positioned exteriorly of said shells for directing a fluid cleaning agent against said media as it is advanced.

References Cited by the Examiner
UNITED STATES PATENTS

| | | | |
|---|---|---|---|
| 1,538,742 | 5/1925 | Price | 210—400 X |
| 2,867,324 | 1/1959 | Hirs | 210—138 X |
| 2,867,326 | 1/1959 | Hirs | 210—138 X |
| 3,084,987 | 4/1963 | Bounin | 210—401 X |
| 3,225,928 | 12/1965 | Black | 210—160 X |

FOREIGN PATENTS 1,219,164  12/1959  France.

REUBEN FRIEDMAN, *Primary Examiner.*

SAMIH N. ZAHARNA, *Examiner.*